US008493575B2

(12) United States Patent
Safonov et al.

(10) Patent No.: US 8,493,575 B2
(45) Date of Patent: *Jul. 23, 2013

(54) METHOD OF FORMING CHARACTERS FOR MICROPRINT AND IMAGE FORMING APPARATUS USING THE SAME

(75) Inventors: Ilia Vladimirovich Safonov, Moscow (RU); Sergey Yur'evich Yakovlev, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/540,910

(22) Filed: Jul. 3, 2012

(65) Prior Publication Data

US 2012/0268754 A1 Oct. 25, 2012

Related U.S. Application Data

(63) Continuation of application No. 12/356,700, filed on Jan. 21, 2009.

(30) Foreign Application Priority Data

Jan. 23, 2008 (RU) .................................. 2008101807
Nov. 24, 2008 (KR) ......................... 10-2008-0116797

(51) Int. Cl.
 *G06K 15/00* (2006.01)
 *G06K 15/02* (2006.01)
(52) U.S. Cl.
 USPC ........................................ 358/1.11; 358/1.16
(58) Field of Classification Search
 USPC ............ 358/474, 1.11; 340/5.86, 10.1, 10.51, 340/10.52, 572.1; 719/315
 See application file for complete search history.

(56) References Cited

U.S. PATENT DOCUMENTS

| 5,146,547 | A | 9/1992 | Beck et al. |
| 5,163,122 | A | 11/1992 | Urabe et al. |
| 5,754,712 | A | 5/1998 | Tanaka et al. |
| 5,823,576 | A | 10/1998 | Lambert |
| 6,045,656 | A | 4/2000 | Foster et al. |
| 7,152,047 | B1 | 12/2006 | Nagel |
| 7,270,918 | B2 | 9/2007 | Blood et al. |
| 2003/0021437 | A1 | 1/2003 | Hersch et al. |
| 2003/0038952 | A1 | 2/2003 | Matsukubo et al. |
| 2003/0214513 | A1 | 11/2003 | Brown et al. |
| 2005/0007611 | A1 | 1/2005 | Matsukubo et al. |
| 2005/0134884 | A1 | 6/2005 | Rombola et al. |
| 2007/0252838 | A1 | 11/2007 | Hains et al. |

FOREIGN PATENT DOCUMENTS

| EP | 1850273 | 10/2007 |
| JP | 2008112261 | 5/2008 |

OTHER PUBLICATIONS

Louisa Lam, Seong-Whan Lee, and Ching Y. Suen, "Thinning Methodologies—A Comprehensive Survey", IEEE Tr. PAMI, vol. 14, No. 9, pp. 869-885, 1992).

Shai Avidan, Ariel Shamir, "Seam Carving for Content-Aware Image Resizing", ACM Transactions on Graphics, vol. 26, Nov. 3, SIGGRAPH 2007).

United States Office Action issued Nov. 28, 2011 in U.S. Appl. No. 12/356,700.

*Primary Examiner* — Jerome Grant, II
(74) *Attorney, Agent, or Firm* — Stanzione & Kim, LLP

(57) ABSTRACT

Disclosed is a method of forming characters for microprint and an image forming apparatus using the same. The method of forming characters for microprint includes determining for every image character a size font taking into account the rules to create small prints, rasterizing a character into a bitmap, skeletonizing the bitmap, reformatting the bitmap maintaining a character legibility, storing the bitmap, and forming halftoning cells from the reformatted bitmap.

19 Claims, 6 Drawing Sheets

```
4 dict dup
begin
    /HalftoneType  3 def
    /Whidth        10 def
    /Height        10 def
    /Thresholds  < 0 0 0 0 0 0 0 0 0 0 0 0 0 0 0 0 0 0 0 0
                   0 0 0 0 F F 0 0 0 0 0 0 F F F F 0 0 0 0
                   0 0 0 0 0 0 F F 0 0 0 0 0 0 F F 0 0 0 0
                   0 0 0 0 F F F F 0 0 0 0 0 0 F F F F 0 0
                   0 0 F F 0 0 0 0 F F 0 0 0 0 F F 0 0 0 0
                   0 0 0 0 0 0 0 0 0 0 0 0 0 0 0 0 0 0 0 0
                   0 0 0 0 0 0 F F F F F F F F F F 0 0 0 0
                   0 0 0 0 0 0 F F 0 0 0 0 0 0 F F 0 0 0 0
                   0 0 0 0 0 0 F F F F F F F F F F 0 0 0 0
                   0 0 0 0 0 0 0 0 0 0 0 0 0 0 0 0 0 0 0 0 > def
end sethalftone
0 . 9 setgray
currentpoint 10  10 rectfill
```

METHOD OF FORMING CHARACTERS FOR MICROPRINT AND IMAGE FORMING APPARATUS USING THE SAME

CROSS-REFERENCE TO RELATED APPLICATIONS

This application is a Continuation Application of prior application Ser. No. 12/356,700, filed on Jan. 21, 2009, in the United States Patent and Trademark Office, which claims priority from Russian Patent Application No. 2008101807, filed on Jan. 23, 2008 in Russian Agency for Patents and Trademarks, and Korean Patent Application No. 10-2008-0116797, filed on Nov. 24, 2008 in the Korean Intellectual Property Office, the disclosures of which are incorporated herein by reference.

BACKGROUND OF THE INVENTION

1. Field of the Invention

The present general inventive concept relates to the methods of forming characters for microprint and related technologies and an image forming apparatus using the same, and more particularly, to methods of forming characters for microprint and related technologies and an image forming apparatus using the same, which could be used in modern color and black-and-white printers and multifunction printing devices, thus eliminating the necessity to employ g special micro-fonts.

2. Description of the Related Art

Microprint serves as a function or method to protect and prevent against forgery and unauthorized copying, since it is very difficult to copy a text of very small size correctly in attempt to counterfeit a bank-note or other document bearing a microprinted or related text imprinted thereon. When a bank-note or other document is put into a photocopier, computer scanner, or related device, a line with a microprint text will be perceived by the copier or scanner as a dashed line that will be thereafter rendered as a counterfeit bank-note or printed document. Thus, forgery and unauthorized copying can be prevented. When copied, the microprint will also not be rendered verbatim and literatim in attempts of forgery and unauthorized copying using an offset printing machine, since the text is too small for engraving with lithographic plates using methods well-known for general public or counterfeiters. Therefore, microprint used together with other methods to protect from forgery of bank-notes and documents serves generally for confirmation of the fact of authenticity of a printed bank-note or document.

Moreover, employment of microprint is widespread in producing documents protected from copying. Examples of solutions involving microprint technology can be found, e.g., in U.S. Pat. Nos. 5,823,576, 6,045,656, 7,152,047, and 7,270,918.

Professional offset devices are used in microprinting technology. It is often impossible to print a readable text with a font of a very small size in one typographical point and less possible by employing a normal font and user printing devices. Characters printed with a small size such as one typographical point are significantly distorted and substantially illegible.

Special micro-fonts are usually employed in microprinting. However, every micro-font includes a limited set of characters, e.g., for several languages only, and it is impossible in general to print an arbitrary character. An additional memory is required to store micro-fonts. Development of micro-fonts is a long and complex autonomous process.

Related art to the present general inventive concept are the method and system to print microtext disclosed in the US Patent Laid-out Application No. 2007/0252838, which provide a special micro-font based on the PostScript Type 3 font. This related art has the following disadvantages: the special micro-font is developed autonomously, which deteriorates the usability and requires an additional memory to store the developed micro-font. The micro-font has a limited set of characters, which narrows the range of use thereof. Additionally, special printing devices having a capability of high resolution print are required to microprint, which also narrows the range of use of the related art method and usability thereof.

SUMMARY OF THE INVENTION

An aspect of the present general inventive concept is to provide a method to form micro-font characters having an enlarged range of use and enhanced usability with reduced volume of the used memory, and an image forming apparatus using the same.

Additional aspects and utilities of the present general inventive concept will be set forth in part in the description which follows and, in part, will be obvious from the description, or may be learned by practice of the general inventive concept.

There may be provided a method of forming characters for microprint, the method including determining for every image character, a size of a font, rasterizing a character into a bitmap, skeletonizing the bitmap, reformatting the bitmap maintaining a character legibility, and forming halftoning cells from the reformatted bitmap.

Skeletonizing the bitmap may be performed by a parallel thinning.

Reformatting the bitmap may include determining a pixel significance, and selecting and deleting, at each stage of a multiple iteration reduction, at least one combined group of less significant pixels in the vertical or horizontal direction.

The selecting and deleting of the group of less significant pixels may solve a problem of finding a graph path by applying a dynamic programming algorithm that minimizes a cumulative cost of the trajectory using a graph at a regular network according to the cost map.

A pixel significance may be determined using a weighted cost function, wherein the white pixels of the background have a least cost, terminal or branch pixels of the skeleton have a high or a highest cost depending on the distance to each of them from a reference point, and other pixels of the skeleton of the image character have medium cost depending on the distance to the nearest one of the terminal or branch pixels.

The halftoning cell may be formed from one or several reformatted bitmaps.

The halftoning cell may be formed from a fragment of the reformatted bitmap.

An embodiment of the present general inventive concept may be achieved by providing an image processing unit to form characters for microprint by rasterizing a character into a bitmap skeletonizing the bitmap, reformatting the bitmap maintaining a character legibility, and forming halftoning cells from the reformatted bitmap and a printing unit to print the characters for microprint on a print medium.

The image processing unit may perform a parallel thinning to skeletonize the bitmap.

The image processing unit may reformat the bitmap by determining a pixel significance, and selecting and deleting, at each stage of a multiple reduction, at least one combined group of less significant pixels in the vertical or horizontal direction.

The image processing unit may solve a problem of finding a graph path by applying a dynamic programming algorithm that minimizes a cumulative cost of the trajectory using a graph at a regular network according to the cost map.

The image processing unit may determine the pixel significance using a cost function, wherein white pixels of the background have a least cost, terminal or branch pixels of the skeleton have a high or a highest cost depending on the distance to each of them from a reference point, and other pixels of the skeleton of the image character have medium cost depending on the distance to the nearest one of the terminal or branch pixels.

The image processing unit may form the halftoning cell from one or several reformatted bitmaps.

The image processing unit may form the halftoning cell from a fragment of the reformatted bitmap.

Exemplary embodiments of the present general inventive concept may also be achieved by providing a method for forming characters for microprint, the method including performing a multiple iterative reduction of a bitmap, and determining at the stages of the multiple iterative reduction a pixel significance and deleting pixels having a small significance. At least one combined group of characters is deleted to obtain a new copy of the bitmap having a changed size.

Exemplary embodiments of the present general inventive concept may also be achieved by providing a method for forming characters for microprint, the method including deriving an initial size of a print font of a text fragment, and performing a microprinting operation when the initial font size is less than or equal to one typographical point.

Exemplary embodiments of the present general inventive concept may also be achieved by providing a method for forming characters for microprint, the method including checking whether an existing bitmap of a microtext character is stored for the microtext character, and generating a new bitmap and halftoning cell of the microtext character when there is not an existing bitmap.

Exemplary embodiments of the present general inventive concept may also be achieved by providing a computer readable medium to contain computer-readable codes as a program to perform a method, the method including determining for every image character, a size of a font, rasterizing a character into a bitmap, skeletonizing the bitmap to create a skeleton, reformatting the bitmap maintaining a character legibility, and forming halftoning cells from the reformatted bitmap.

The technical result of the present general inventive concept consists in enlarging the range of use, enhancing the usability and reducing the memory volume required for carrying out the method.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 4 illustrates the example of the script in the PostScript language to print a microtext character forming a halftoning cell.

DETAILED DESCRIPTION OF THE PREFERRED EMBODIMENTS

Figure 1:
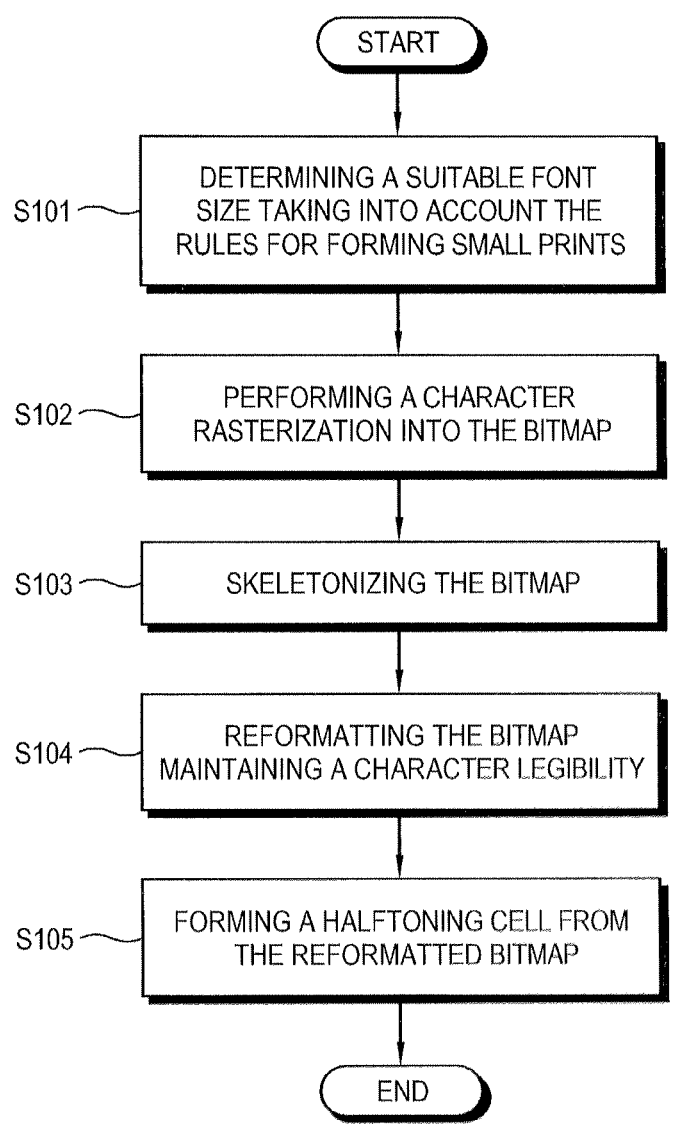
FIG. 1 illustrates an operational diagram of carrying out the method to form characters for the microprint in accordance with the present general inventive concept

In order to better understand the general inventive concept general inventive concept, the detailed description along with the accompanying drawings is adduced below.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
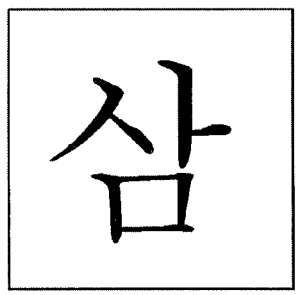
FIG. 2 illustrates the example of processing two characters using the method to form characters for the microprint in accordance with the general inventive concept.
Figure 2:
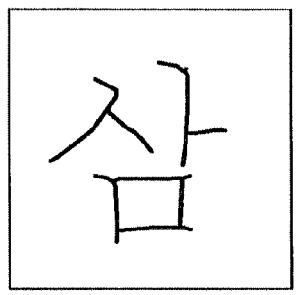
Figure 2:
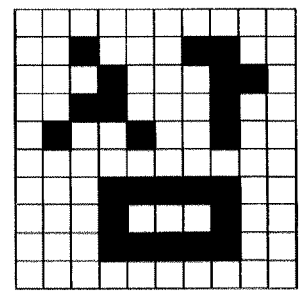
Figure 2:
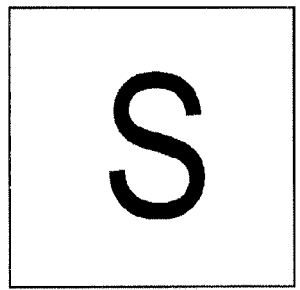
Figure 2:
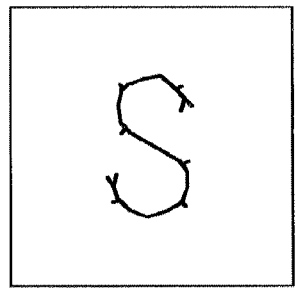
Figure 2:
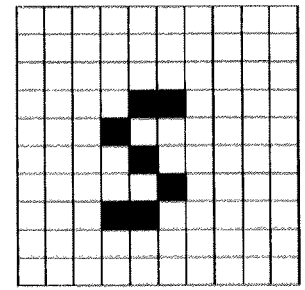

An operation to implement a method to form characters for microprint using the example of two image characters is considered with reference to FIGS. 1 and 2. In an operation designated as (S101), a suitable font size taking into account the rules for forming small prints is selected. While selecting the font, a compromise between the bitmap size and character legibility is complied with. In an operation designated as (S102), a character rasterization into the bitmap, i.e., into an image of FIGS. 2(a) and 2(d) is preformed by applying the selected font size. The character is always rasterized as black pixels in the foreground of a white background or white pixels in the foreground of a black background, without taking into account the color of the initial character and background.

In an operation designated as (S103), the bitmap is skeletonized, herewith employing preferably, from the variety of existing skeletonization algorithms (thinning, constructing a carcass), one of technologies of parallel thinning described in the article by Louisa Lam, Seong-Whan Lee, and Ching Y. Suen, "Thinning Methodologies—A Comprehensive Survey", IEEE Tr. PAMI, vol. 14, no. 9, pp. 869-885, 1992). The result of the bitmap skeletonization is illustrated in FIGS. 2(b) and 2(e).

In an operation designated as (S104), the bitmap is reformatted maintaining a character legibility, herewith performing a multiple iterative reduction of the bitmap, and determining, at the stages of the multiple iterative reduction, a pixel significance and deleting pixels having a small significance. In order to prevent a distortion occurrence, at least one combined group of less significant pixels in the vertical or horizontal direction is determined at every stage of the multiple iterative reduction. The essence of the operation designated as (S104) consists in repetition and deleting herewith, at every reducing operation, at least one combined group of characters to obtain a new copy of the bitmap having a changed size. The obtained bitmap is used as the initial one for the next iteration, and the process is repeated until obtaining a required size. The pixel significance is determined by a weighted cost function, in which the pixels of the white background have the least cost, terminal or branch pixels of the carcass or skeleton of an image fragment have a high or the highest cost depending on the distance to each of them from a reference point, and other pixels of the carcass or skeleton have a medium cost depending on the distance to the nearest one of the terminal or branch pixels.

Owing to pixel deletion, the distances from a reference point, and hence the pixel costs may be changed through multiple iterations. A cost map is calculated, where every element of the carcass or skeleton represents a significant pixel in the bitmap. The cost map is used to assign a weight for graph arcs of the carcass or skeleton that are directed towards an element of the cost map. In order to solve a problem of finding an optimal path of junctions in the vertical or horizontal direction, a graph is plotted at a regular network according to the cost map. The optimal path is determined as a trajectory having a minimal cumulative cost. This trajectory can be found using a dynamic programming algorithm (one of the suitable algorithms is described in the article by Shai Avidan, Ariel Shamir, "Seam Carving for Content-Aware Image Resizing", ACM Transactions on Graphics, Volume 26, November 3, SIGGRAPH 2007). FIGS. 2(c) and 2(f) show the output reformatted image characters for a bitmap of 10×10 pixels.

Figure 3:
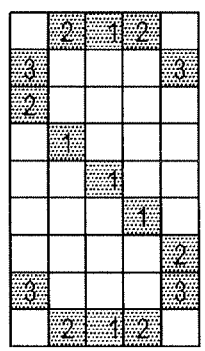
FIG. 3 illustrates the example of plotting the trajectories to delete one vertical and one horizontal lines.
Figure 3:
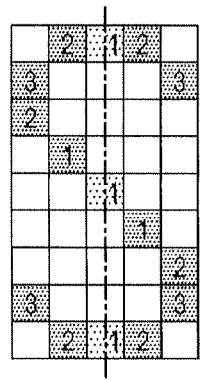
Figure 3:
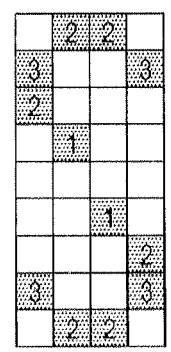
Figure 3:
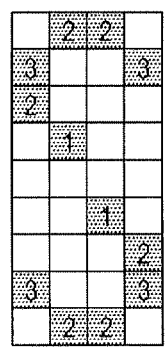
Figure 3:
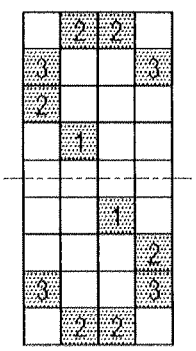
Figure 3:
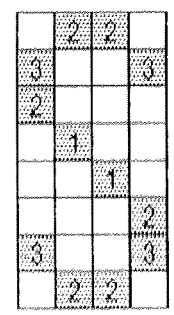

FIG. 3 illustrates an example of assigning pixel cost and plotting trajectories to delete one vertical and one horizontal line: FIG. 3 (a) demonstrates values of the pixel weights in the beginning of the iteration, all pixels of the white background having the least cost. FIG. 3(b) illustrates a found trajectory in the vertical direction, of which the trajectory has a minimal cumulative cost. FIG. 3(c) illustrates a result of this iteration, i.e., reformatting the bitmap by way of deleting the pixels of the found trajectory. FIG. 3 (views FIGS. 3(d), 3(e) and 3(f)) demonstrate the next iteration that consists in finding and deleting a pixel trajectory in the horizontal direction.

In an operation designated as (S105) illustrated in FIG. 1, generation of a halftoning cell from the reformatted bitmap is performed. In this operation, there is a possibility to take into account a character color. FIG. 4 illustrates a fragment of the script in the PostScript language to print a microtext character by forming the halftoning cell.

The method to form characters for microprint according to an exemplary embodiment of the present general inventive concept could be applied for several print protocols and languages. Moreover, there is a possibility to include the bitmaps of several characters into one halftoning cell, and, conversely, only a fragment of the character bitmap could be included into one halftoning cell.

Figure 5:
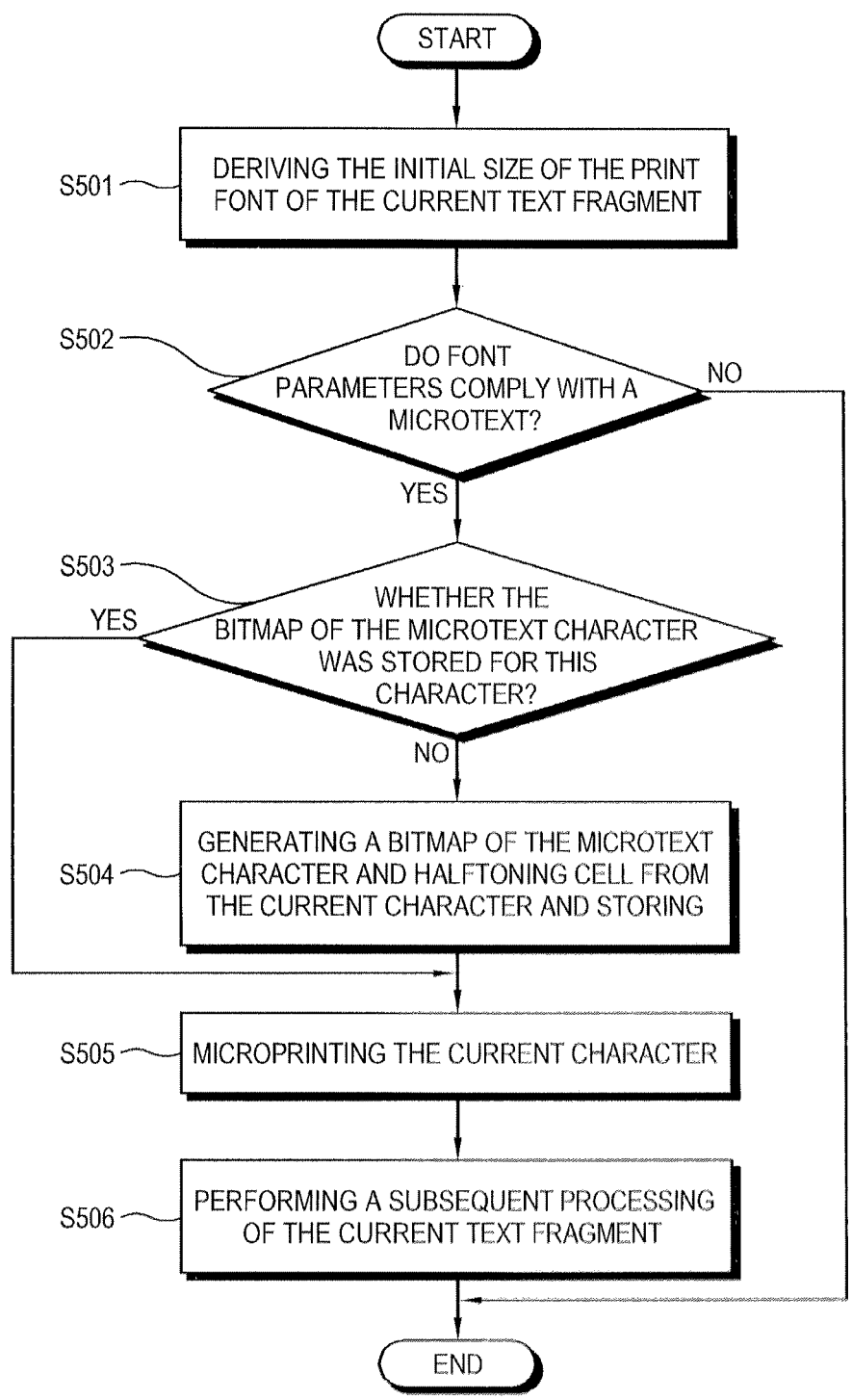
FIG. 5 illustrates an operational diagram of the method to microprint using the method to form characters for the microprint in accordance with an exemplary embodiment of the present general inventive concept.

FIG. 5 illustrates an exemplary operational diagram of a method to microprint using a method to form characters for microprint. In an operation designated as S501, the initial size of the print font of the current text fragment is derived. If the initial font size is less than or equal to one typographical point, then the font size relates to the microtext (condition S502), and the operations of microprinting are performed. The condition (S503) checks, whether an existing bitmap of the microtext character was stored for this character. If this character is processed for the first time, then the character for microprinting is formed, that is, a new bitmap of the microtext character and halftoning cell are generated in an operation designated as (S504). The microprint of the current character is performed in an operation designated as (S505). Further, a subsequent processing of the current text fragment is performed in an operation designated as (S506).

The method to form characters for microprint according to an exemplary embodiment of the present general inventive concept is based on the following image conversion technologies: rasterization into sufficiently large bitmap, skeletonization, and specific reformatting of the bitmap maintaining the legibility.

The real time conversion rate in the method depends on the bitmap size that depends in turn on the font size and print resolution. Preferably, the font size for rasterization is selected of 5 to 8 typographical points.

The method to form characters for microprint according to an exemplary embodiment of the present general inventive concept permits an additional possibility of microprinting to the modern color and black-and-white printers and multi-function printing devices without employing special micro-fonts. Characters of any fonts could be converted into microtext in real time. It is possible to build the proposed method into a raster image processor (RIP) or printer driver.

Figure 6:
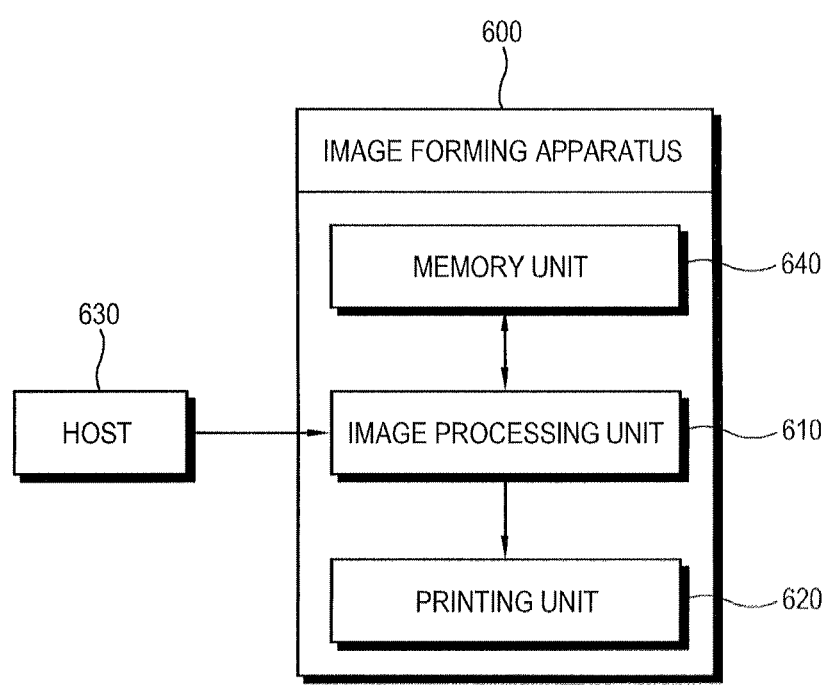
FIG. 6 illustrates a schematic block diagram of an image forming apparatus in accordance with an exemplary embodiment of the present general inventive concept.

FIG. 6 is a schematic block diagram of an image forming apparatus in accordance with an exemplary embodiment of the present general inventive concept. Referring to FIG. 6, an image forming apparatus 600 includes an image processing unit 610 to process image characters, and a printing unit 620 to print the processed image characters on a print medium. In this exemplary embodiment, the image forming apparatus includes a printer, a multifunction peripheral (MFP), a digital copying machine, or other known image forming device. The image forming apparatus of the present general inventive concept also includes a memory unit 640. The memory unit 640 may further include non-volatile memory such as a ROM unit to store program data to carry out the algorithms as described herein as well as volatile memory such as a RAM unit to temporarily store image and other data received from the host 630, other input sources, or data generated during any of the processes described herein.

The image processing unit 610 forms characters for microprint based on the image characters of a suitable font size taking into account the rules for forming small prints provided from a host 630. That is, the characters for microprint are formed by rasterizing the image character into a bitmap, skeletonizing the bitmap, reformatting the bitmap maintaining a character legibility, and forming halftoning cells from the reformatted bitmap. The image processing unit 610 processes the image on the basis of the foregoing method of forming characters for microprint according to an exemplary embodiment of the present general inventive concept, and thus repetitive descriptions thereof will be avoided.

The printing unit 620 prints the characters for microprint formed by the image processing unit 610 on a print medium. The printing unit 620 forms an image by an inkjet method, a thermal transfer method, an electrophotographic method, or other known methods or processes. The configuration and the image forming mechanism of the printing unit 620 are publicly known, and therefore descriptions thereof will be omitted.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Further, the method of forming characters for microprint according to an exemplary embodiment of the present general inventive concept may be achieved by a printer driver installed in the host. Also, some operations of this character forming method may be implemented by the printer driver, and the other operations may be implemented by the image processing unit of the image forming apparatus.

While the above embodiment of the present general inventive concept has been set forth as illustrating the present general inventive concept, those skilled in the art will appreciate that various modifications, additions and substitutions are possible without departing from the scope and spirit if the present general inventive concept as recited herein an in the appended claims.

What is claimed is:

1. A method of forming characters for microprint, the method comprising:
   determining whether an initial font size of an image character is less than or equal to a predetermined size;
   determining whether an existing bitmap of the image character is stored for the character;
   rasterizing a character into a bitmap;
   skeletonizing the bitmap;
   reformatting the bitmap to maintain a character legibility by determining a rank of pixel significance of combined groups of pixels to be high, medium or low and selecting and deleting at least one combined group of less significant pixels than another combined group in the vertical or horizontal direction; and
   forming halftoning cells from the reformatted bitmap.

2. The method of claim 1, wherein skeletonizing the bitmap is performed by parallel thinning.

3. The method of claim 1, wherein reformatting the bitmap further comprises:
   determining a pixel significance of other combined groups of pixels; and
   selecting and deleting, at a plurality of stages of a multiple iteration reduction, other combined groups of less significant pixels in the vertical or horizontal directions.

4. The method of claim 3, wherein the selecting and deleting of the group of less significant pixels applies a dynamic programming algorithm that minimizes a cumulative cost of a trajectory using a graph at a regular network according to a cost map.

5. The method of claim 4, wherein a pixel significance is determined using a weighted cost function,
   wherein white pixels of a background of the bitmap have a least cost, terminal or branch pixels of the skeleton have a high or a highest cost depending on the distance to each of them from a reference point, and other pixels of the skeleton of the image character have medium cost depending on the distance to the nearest one of the terminal or branch pixels.

6. The method of claim 1, wherein the halftoning cell is formed from one or several reformatted bitmaps.

7. The method of claim 1, wherein the halftoning cell is formed from a fragment of the reformatted bitmap.

8. The method of claim 1, wherein a font size for the rasterization is selected of 5 to 8 typographical points.

9. The method of claim 1, wherein the predetermined size is one typographical point.

10. An image forming apparatus comprising:
    an image processing unit to form characters for microprint by rasterizing a character into a bitmap skeletonizing the bitmap, reformatting the bitmap maintaining a character legibility by determining a pixel significance of combined groups of pixels to be ranked as high, medium or low and selecting and deleting at least one combined group of less significant pixels than another combined group in the vertical or horizontal direction, and forming halftoning cells from the reformatted bitmap;
    a storing unit to store the reformatted bitmap; and
    a printing unit to print the characters for microprint on a print medium.

11. The image forming apparatus of claim 10, wherein the image processing unit performs parallel thinning to skeletonize the bitmap.

12. The image forming apparatus of claim 10, wherein the image processing unit further reformats the bitmap by determining a pixel significance of other combined groups of pixels, and selecting and deleting, at a plurality of stages of a multiple iteration reduction, other combined groups of less significant pixels in the vertical or horizontal directions.

13. The image forming apparatus of claim 12, wherein the image processing unit applies a dynamic programming algorithm that minimizes a cumulative cost of a trajectory using a graph at a regular network according to a cost map.

14. The image forming apparatus of claim 13, wherein the image processing unit determines the pixel significance using a cost function,
    wherein white pixels of a background of the bitmap have a least cost, terminal or branch pixels of the skeleton have a high or a highest cost depending on the distance to each of them from a reference point, and other pixels of the skeleton of the image character have medium cost depending on the distance to the nearest one of the terminal or branch pixels.

15. The image forming apparatus of claim 10, wherein the image processing unit forms the halftoning cell from one or several reformatted bitmaps.

16. The image forming apparatus of claim 10, wherein the image processing unit forms the halftoning cell from a fragment of the reformatted bitmap.

17. A method of forming characters for microprint, the method comprising:
    determining that a font size of an image character is less than or equal to a predetermined size;
    determining that an existing bitmap of the image character has not been stored for the character;
    performing a multiple iterative reduction of the image character to form a bitmap of the image character; and
    determining at stages of the multiple iterative reduction a ranked pixel significance from combined groups of pixels of the bitmap having a high, medium or low significance, and deleting combined groups of pixels having a small significance in a vertical or horizontal direction in relation to the other combined groups of pixels.

18. The method of claim 17, comprising:
    deleting at least one combined group of characters to obtain a new copy of the bitmap having a changed size.

19. The method of claim 17, wherein the predetermined size is one typographical point.

* * * * *